United States Patent
Park et al.

(10) Patent No.: US 7,885,170 B2
(45) Date of Patent: Feb. 8, 2011

(54) READING/WRITING HEAD USING ELECTRIC FIELD, DATA READING/WRITING APPARATUS INCLUDING THE SAME, AND METHOD OF MANUFACTURING THE SAME

(75) Inventors: Chul-min Park, Yongin-si (KR);
Ju-hwan Jung, Seoul (KR);
Hyoung-soo Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 12/142,048

(22) Filed: Jun. 19, 2008

(65) Prior Publication Data

US 2009/0161524 A1 Jun. 25, 2009

(30) Foreign Application Priority Data

Dec. 24, 2007 (KR) ...................... 10-2007-0136397

(51) Int. Cl.
*G11B 7/00* (2006.01)

(52) U.S. Cl. ...................................... 369/126; 369/100
(58) Field of Classification Search ....................... None
See application file for complete search history.

(56) References Cited

U.S. PATENT DOCUMENTS

| 7,397,624 | B2* | 7/2008 | Johns et al. | 360/75 |
| 7,672,214 | B2* | 3/2010 | Ono et al. | 369/126 |
| 7,754,353 | B2* | 7/2010 | Newns | 428/800 |

* cited by examiner

*Primary Examiner*—Muhammad N Edun
(74) *Attorney, Agent, or Firm*—Sughrue Mion, PLLC

(57) ABSTRACT

A data reading/writing head reading/writing data from/to a ferroelectric recording medium by using an electric field effect, includes a semiconductor body having a first plane on which an air bearing pattern is formed and a second plane crossing the first plane. A sensing unit is located on the second plane and reads data written to the ferroelectric recording medium, wherein the second plane is separated from the first plane, and a floating gate is disposed on the sensing unit, wherein an end of the floating gate extends to the first plane to guide an electric field from the ferroelectric recording medium to the sensing unit.

18 Claims, 10 Drawing Sheets

DOPANT IMPLANTATION WITH LOW CONCENTRATION

READING/WRITING HEAD USING ELECTRIC FIELD, DATA READING/WRITING APPARATUS INCLUDING THE SAME, AND METHOD OF MANUFACTURING THE SAME

CROSS-REFERENCE TO RELATED PATENT APPLICATION

This application claims the benefit of Korean Patent Application No. 10-2007-0136397, filed on Dec. 24, 2007, in the Korean Intellectual Property Office, the disclosure of which is incorporated herein in its entirety by reference.

BACKGROUND OF THE INVENTION

1. Field of the Invention

The present invention relates to a reading/writing head, a data reading/writing apparatus including the same, and a method of manufacturing the same, and more particularly, to a reading/writing head reading/writing data via an electric field effect, a data reading/writing apparatus including the same, and a method of manufacturing the same.

2. Description of the Related Art

A hard disk drive (HDD) is a data reading/writing apparatus reading/writing data by using a magnetic read/write head moving above a spinning recordable medium. More particularly, the magnetic read/write head forms a plurality of magnetic domains magnetized in a first direction and a second direction, opposite to the first direction, on the recordable medium by generating a magnetic field, and allocates data '0' to magnetic domains magnetized in the first direction and data '1' to magnetic domains magnetized in the second direction.

The writing density of an HDD using a magnetic data writing method has dramatically increased in the last few decades. Currently, an HDD of a horizontal magnetic data writing type may obtain a recording density of approximately 100 gigabits per square inch ($Gb/in^2$), while an HDD of a vertical data magnetic recording type may obtain a writing density of approximately 500 $Gb/in^2$. However, there is a limit in increasing the writing density of an HDD using a magnetic data reading/writing method, because it is difficult for a magnetic data reading/writing head to generate a strong local magnetic field.

Recently, a ferroelectric data reading/writing medium, to which data is written by using electric field, and an electric field sensor for reading/writing data from/to the ferroelectric recording medium have been developed. In a method of writing data by using an electric field, electric domains polarized in a first polarizing direction and a second polarizing direction, opposite to the first direction, are formed on a ferroelectric material, and data '0' and data '1' are respectively assigned to electric domains polarized in the first polarizing direction and electric domains polarized in the second polarizing direction. Since the resistance of an electric field sensor varies with the direction in which electric domains are polarized, the current flowing between a source electrode and a drain electrode of a reading/writing head vary, and data written to the electric domains can be read current variation. In this case, it is possible to obtain a recording density higher than 1 terabit per square inch ($Tb/in^2$).

SUMMARY OF THE INVENTION

The present invention provides a data reading/writing head reading/writing data from/to a ferroelectric recording medium, a method of manufacturing the same, and a data reading/writing apparatus including the data reading/writing head.

According to an aspect of the present invention, there is provided a data reading/writing head using an electric field, the data reading/writing head including a body having a first plane on which an air bearing pattern is formed and a second plane crossing the first plane, a sensing unit, which is located on the second plane and reads data written to a ferroelectric recording medium, wherein the sensing unit is separated from the first plane, and a floating gate disposed on the sensing unit, having an end extending to the first plane to guide an electric field of the ferroelectric recording medium to the sensing unit.

According to another aspect of the present invention, there is provided a data reading/writing head including a body having a first plane on which an air bearing pattern is formed and a second plane crossing the first plane, a sensing unit, which is located on the second plane and reads data written to a ferroelectric recording medium, wherein the sensing unit is separated from the first plane and includes a source region and a drain region, which are high-concentration dopant regions, and a resistance region, which is a low-concentration dopant region and located between the source region and the drain region, a buffer disposed between the sensing unit and the first plane, and a floating gate disposed on the resistance region, having an end extending over the buffer to the first plane to guide an electric field of the ferroelectric recording medium to the resistance region.

The data reading/writing head using electric field further includes a writing electrode disposed on the floating gate and an insulation layer interposed between the writing electrode and the floating gate.

According to another aspect of the present invention, there is provided a data reading/writing apparatus including a ferroelectric recording medium and the aforementioned data reading/writing head floating above the ferroelectric recording medium and reading/writing from/to the ferroelectric recording medium by using an electric field effect.

According to another aspect of the present invention, there is provided a method of manufacturing a data reading/writing head using an electric field, the method including forming a sensing unit separated from an imaginary dicing surface, the sensing unit including a source region, a drain region, and a resistance region, wherein the source and drain regions are high-concentration dopant regions and the resistance region is a low-concentration dopant region formed between the source region and the drain region, forming a floating gate one end of which extends toward the imaginary dicing surface by stacking conductive materials on the resistance region, dicing the semiconductor substrate along the imaginary dicing surface, polishing the diced surface to expose the floating gate, and forming an air bearing pattern on the polished surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
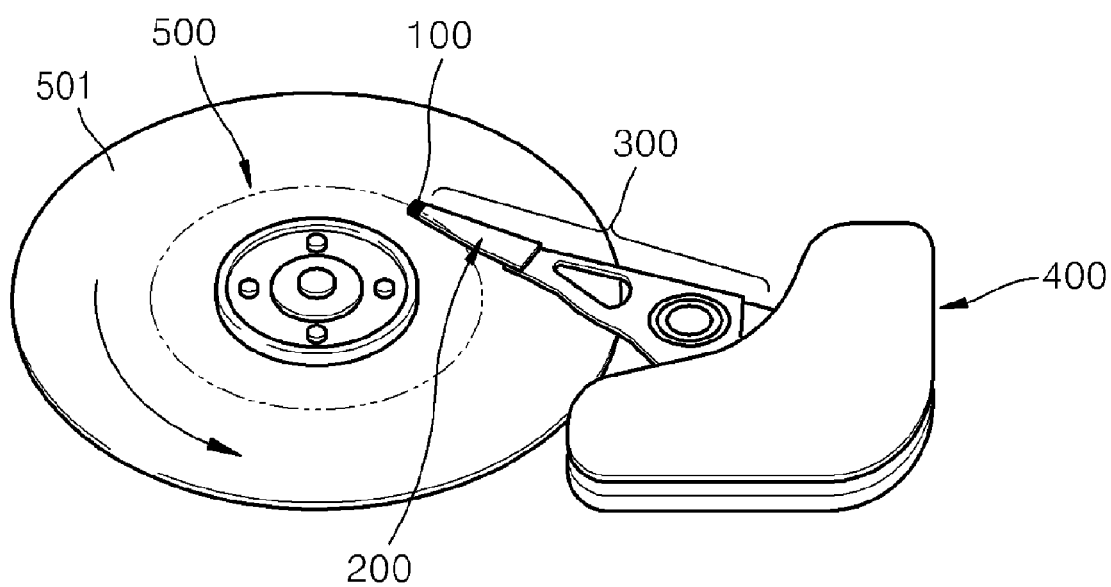
FIG. 1 is a perspective view of a data reading/writing apparatus using an electric field, according to an embodiment of the present invention.

The present invention will now be described more fully with reference to the accompanying drawings, in which exemplary embodiments of the invention are shown. In the drawings, the widths and thicknesses of layers and regions are exaggerated for clarity. Reference numerals in the drawings denote like elements.

FIG. 1 is a perspective view of a data reading/writing apparatus using an electric field, according to an embodiment of the present invention. The data reading/writing apparatus is a hard disk drive (HDD) type apparatus including a spinning recording medium 500. The recording medium 500 is a ferroelectric recording medium formed by sequentially stacking a lower electrode and a ferroelectric layer on a semiconductor substrate. The semiconductor substrate may be formed of a material such as silicon (Si) or glass. The lower electrode may be formed of an electrode material used in semiconductor memory devices, for example, a metal such as platinum (Pt), aluminum (Al), gold (Au), silver (Ag), and copper (Cu), or a metal oxide such as $SrRuO_3$ and $(La, Sr)CoO$. The lower electrode is grounded. The ferroelectric layer may be formed of a ferroelectric material such as $PZT(PbZr_xTi_{1-x}O_3)$, $PbTiO_3$, $PbZrO_3$, $SrBi_2Ta_2O_9$ (SBT), $KNbO_3$, $LiTaO_3$, or $LiNbO_3$. A protective layer may further be formed on the ferroelectric layer. The protective layer may be formed by using both diamond-like carbon (DMC) and a lubricant used in the case of a conventional hard disk, or may be formed by using one of DMC and the lubricant.

A data reading/writing head 100 in the data reading/writing apparatus is mounted on a suspension arm 200 disposed on an end of a swing arm 300. The swing arm 300 is actuated by a voice coil motor 400. As the recording medium 500 spins, the data reading/writing head 100 moves up from a top surface of the recording medium 500 due to an air bearing effect. A driving system of the data reading/writing apparatus according to an embodiment of the present invention shown in FIG. 1 is identical to a driving system of a conventional HDD. However, a magnetic recording medium in the conventional HDD is replaced by a ferroelectric recording medium according to an embodiment of the present invention, and a data reading/writing head using a magnetic field in the conventional HDD is replaced by a data reading/writing head using an electric field.

Figure 2:
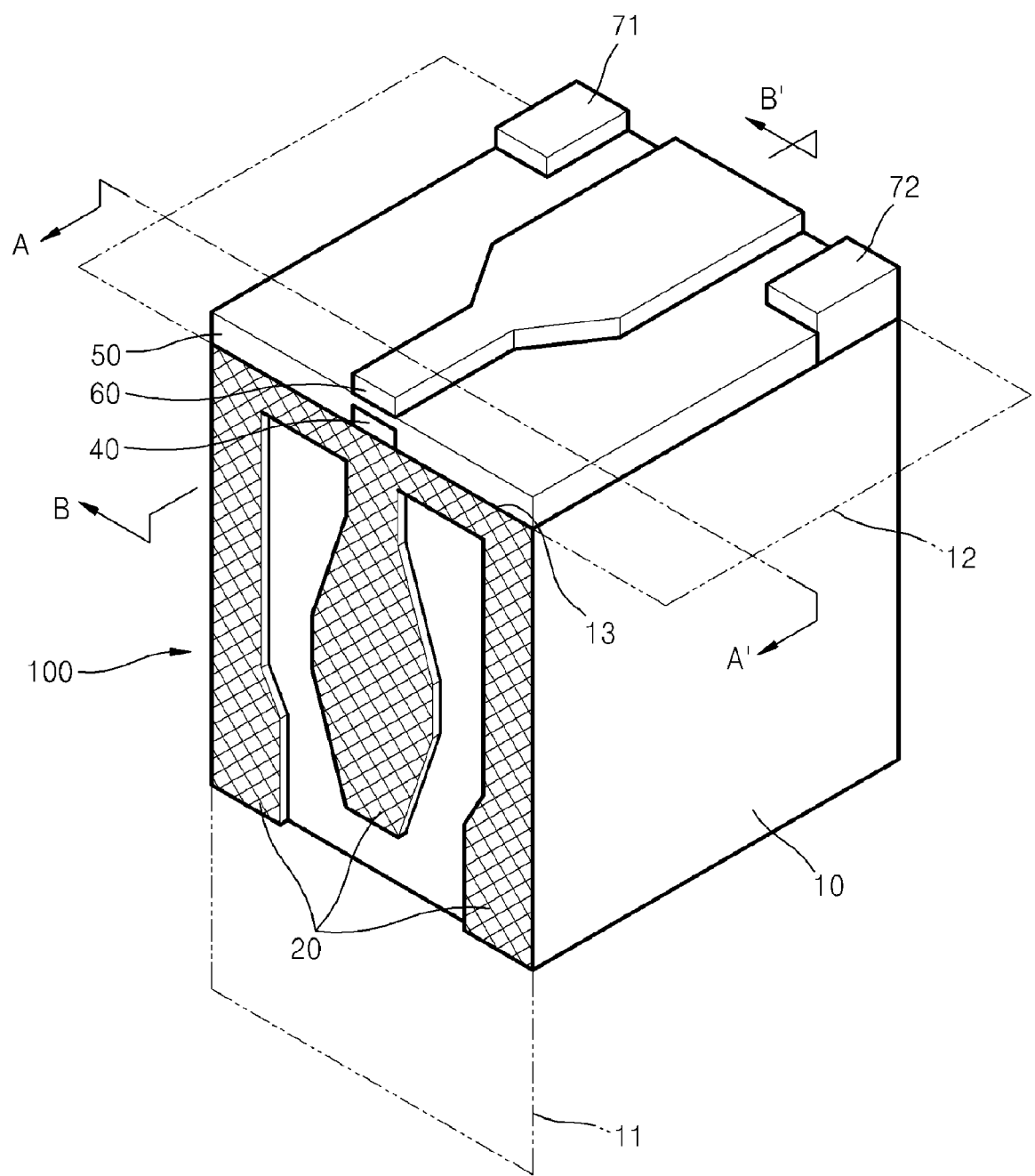
FIG. 2 is a perspective view of a data reading/writing head using an electric field, according to an embodiment of the present invention.
Figure 3:
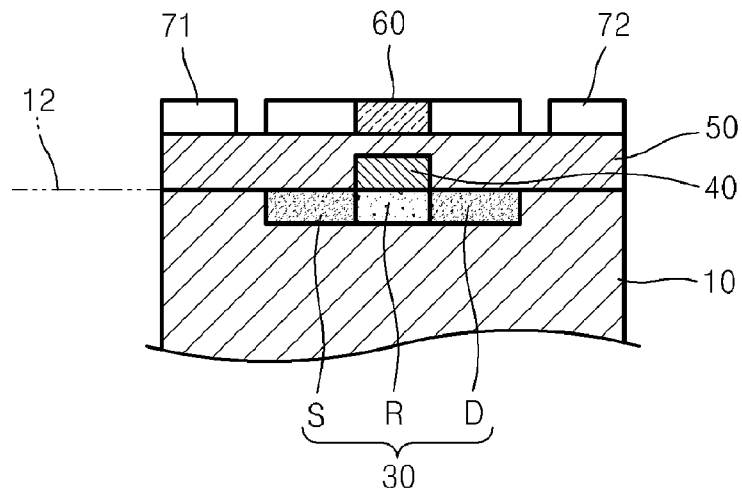
FIG. 3 is a cross-sectional view of the data reading/writing head using electric field, taken along line A-A' of FIG. 2.
Figure 4:
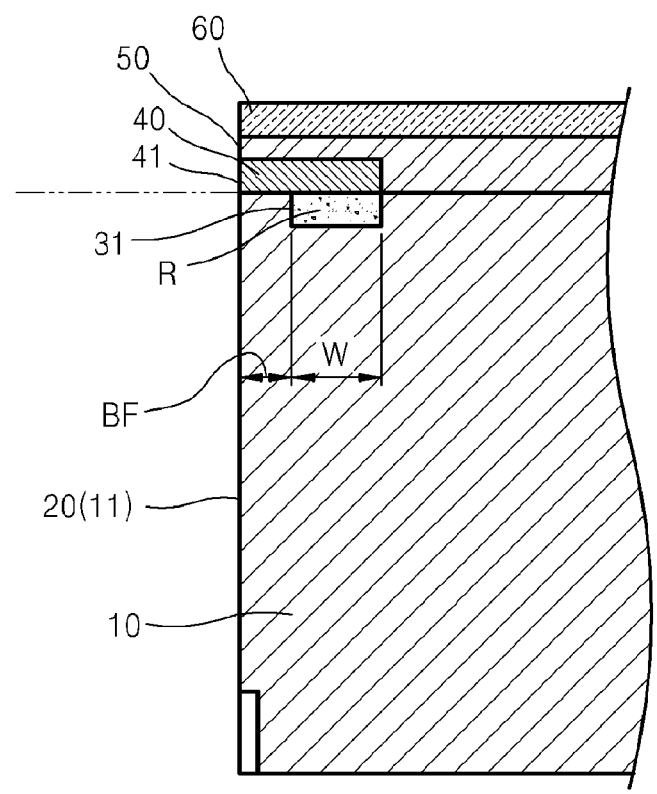
FIG. 4 is a cross-sectional view of the data reading/writing head using electric field, taken along line B-B' of FIG. 2.
Figure 5:
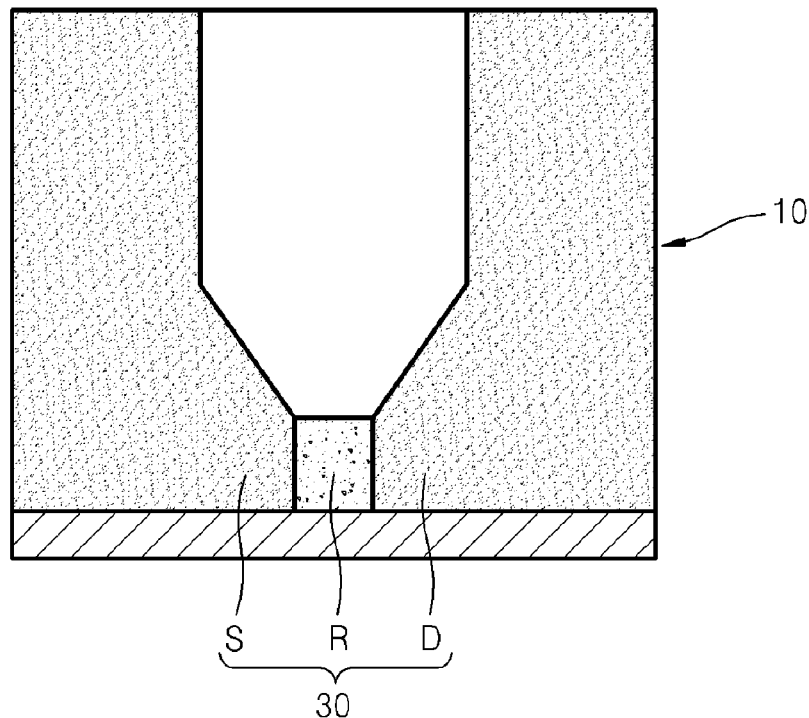
FIG. 5 is a sectional view of the data reading/writing head using electric field of FIG. 2, taken along a second plane.

FIG. 2 is a perspective view of a data reading/writing head 100 using an electric field, according to an embodiment of the present invention. FIG. 3 is a cross-sectional view of the data reading/writing head 100, taken along line A-A' of FIG. 2, and FIG. 4 is a cross-sectional view of the data reading/writing head 100, taken along line B-B' of FIG. 2. FIG. 5 is a sectional view of the data reading/writing head 100, taken along a second plane 12 in FIG. 2. Referring to FIGS. 2 through 5, a semiconductor body 10 includes a first plane 11 and the second plane 12. The first plane 11 is a plane facing a recording surface 501 of the ferroelectric recording medium 500, and an air bearing pattern 20 is formed on the first plane 11. The air bearing pattern 20 forms an air flow such that the data reading/writing head 100 moves up from a top surface of the ferroelectric recording medium 500. Since the air bearing pattern 20 is well known in the art, a detailed description thereof is omitted. The second plane 12 is a plane perpendicularly crossing the first plane 11, however, the present invention is not limited thereto.

A sensing unit 30 includes a resistance region R, a source region S, and a drain region D. The source region S and the drain region D are high-concentration dopant regions. The resistance region R is formed between the source region S and the drain region D, and is a low-concentration dopant region. For example, if the semiconductor body 10 is a p-type semiconductor substrate, the resistance region R is an $n^-$-type dopant region, and the source region S and the drain region D are $n^+$-type dopant regions. In contrast, if the semiconductor body 10 is an n-type semiconductor substrate, the resistance region R is a $p^-$-type dopant region, and the source region S and the drain region D are $p^+$-type dopant regions. For example, phosphorous (P) or arsenic (As) may be used as an n-type dopant, while boron (B) may be used as a p-type dopant.

The resistance region R functions as a gate controlling a current flowing to the source region S and the drain region D, according to its semiconducting characteristics. According to the polarity of an electric field applied to the resistance region R, electrons are either accumulated or depleted in the resistance region R. Thus, the resistance of the resistance region R either decreases or increases.

The sensing unit 30 is disposed on the second plane 12 of the semiconductor body 10. The sensing unit 30, that is, the resistance region R, is located at a certain distance from the first plane 11 of the semiconductor body 10. A region between an edge 31 of the resistance region R and the first plane 11 becomes a buffer BF preventing damage to the resistance region R during a polishing operation described below.

The semiconductor body 10 may be either partially or entirely a semiconductor substrate. If the semiconductor body 10 is partially a semiconductor substrate, at least the region on which the sensing unit 30 is formed must be a semiconductor substrate. The semiconductor substrate may be, for example, a silicon single crystal semiconductor substrate. A case where the semiconductor body 10 is entirely a semiconductor substrate will be described below.

The data reading/writing head 100 further includes a floating gate 40. The floating gate 40 is a conductor. In the data reading/writing head according to an embodiment of the present invention, the sensing unit 30 is separated from the first plane 11 of the semiconductor body 10. Therefore, an electric field from electric domains of the ferroelectric medium 500 may not be able to reach the resistance region R. Even if the electric field reaches the resistance region R, the electric field will not be strong enough for the resistance region R to function as a gate controlling the current flowing to the source region S and the drain region D. Therefore, the data reading/writing head 100 according to the present invention further includes the floating gate 40 to guide an electric field, generated by the electric domains of the ferroelectric recording medium 500, to the sensing unit 30, that is, the resistance region R. The floating gate 40 is electrically connected to the resistance region R. Also, an end 41 of the floating gate 40 extends to the first plane 11 of the semiconductor body 10.

When the resistance region R is an n⁻ region, if the electric domains of the ferroelectric recording medium 500 facing the floating gate 40 are polarized in a first polarizing direction and a surface charge of the electric domains is negative, an electron density of the resistance region R decreases, and thus the resistance of the resistance region R increases. As a result, a quantity of current flowing across the resistance region R decreases. In contrast, if the electric domains of the ferroelectric recording medium 500 facing the resistance region R are polarized in a second polarizing direction, opposite to the first polarization direction, and a surface charge of the electric domains is positive, the electron density of the resistance region R increases, and thus the resistance of the resistance region R decreases. As a result, a quantity of current flowing across the resistance region R increases. Based on differences in the quantities of current, data written to a top surface of the ferroelectric recording medium 500 can be read. If the resistance region R is a p⁻ type region, one skilled in the art should understand that the data reading operation is performed in an opposite manner.

A writing electrode 60 is disposed on the floating gate 40. An insulation layer 50 is disposed between the floating gate 40 and the writing electrode 60. The writing electrode 60 is an electrode writing data by inducing an electric polarization of the electric domains of the ferroelectric recording medium 500. Through the writing electrode 60, a voltage, of which absolute value is greater than an absolute value of a critical voltage inducing polarization of the ferroelectric recording medium 500, is applied to the ferroelectric recording medium 500. Thus, data can be written to the ferroelectric recording medium 500 by polarizing the electric domains of the ferroelectric recording medium 500 in either the first polarizing direction or the second polarizing direction.

Electrode pads 71 and 72 penetrate the insulation layer 50 and are respectively connected to the source region S and the drain region D.

Since the resistance region R functions as a gate controlling a quantity of current, its size, and particularly its width W (FIG. 3), is very important. Formation of the air bearing pattern 20 includes a polishing operation of the first plane 11 of the semiconductor body 10. In the data reading/writing head 100 according to an embodiment of the present invention, since the sensing unit 30, that is, the resistance region R, is separated from the first plane 11, the resistance region R is not polished during the polishing operation of the first plane 11. Therefore, the width of the resistance region R is not affected by the formation of the air bearing pattern 20, and thus the resistance region R having an accurate width W can be formed.

Hereinafter, a method of manufacturing the data reading/writing head 100 according to an embodiment of the present invention will be described.

Figure 6A:
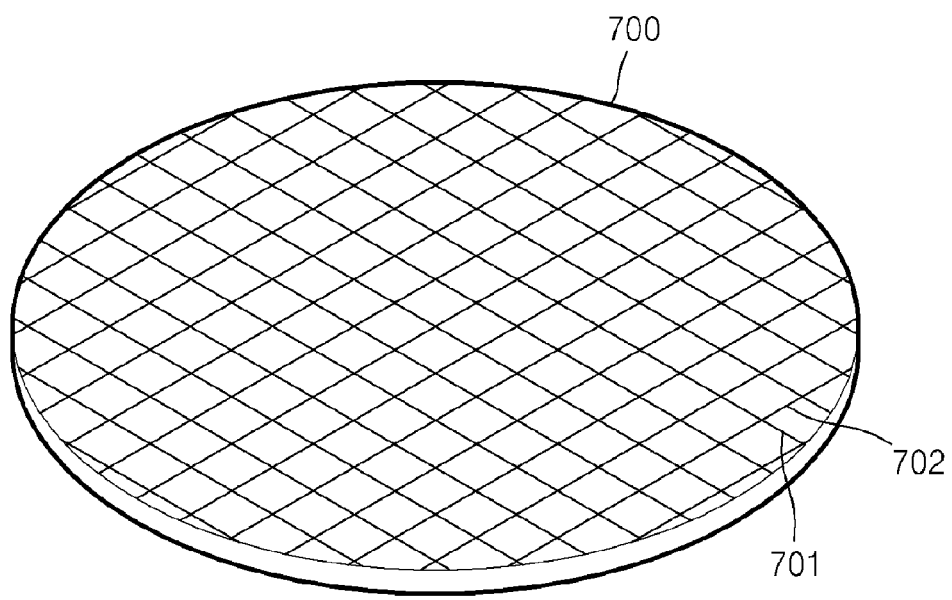
FIGS. 6A through 6C are diagrams for explaining a method of manufacturing a plurality of data reading/writing heads using an electric field from a semiconductor substrate.
Figure 6B:
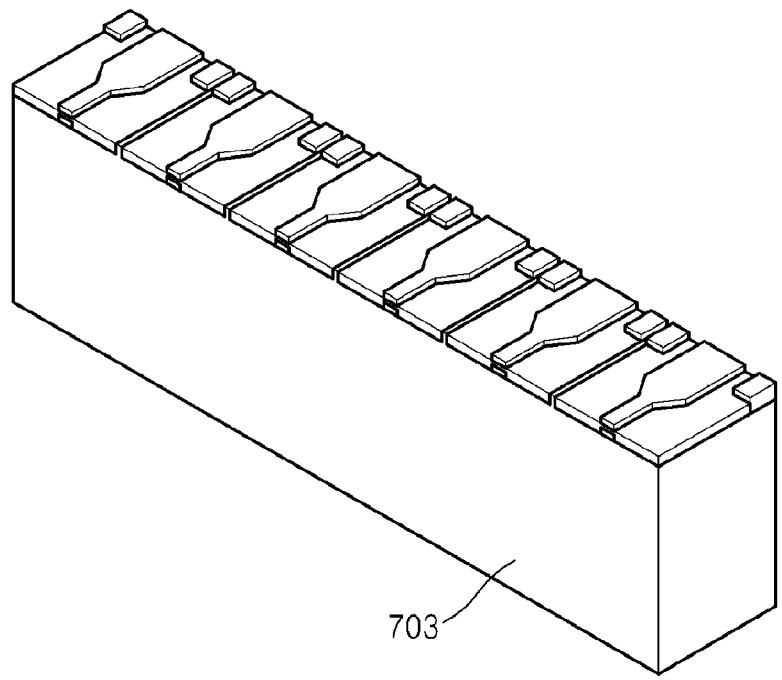
Figure 6C:
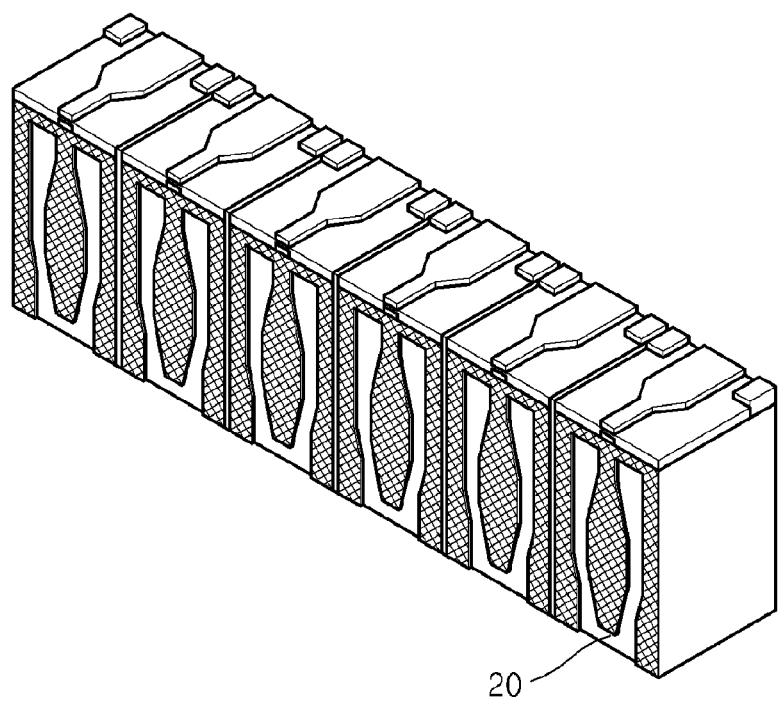

As shown in FIG. 6A, a semiconductor substrate 700 is prepared. In the above embodiment, the semiconductor substrate 700 is a p-type semiconductor substrate formed of silicon, for example. The data reading/writing heads 100 will be formed in each of the regions separated by horizontal lines 701 and vertical lines 702. The horizontal lines 701 and the vertical lines 702 are imaginary lines to show where the data reading/writing heads using electric field 100 will be formed. As shown in FIG. 6B, the semiconductor substrate 700 is diced along the horizontal lines 701, and surfaces of diced sections 703 are polished. Then, the air bearing patterns 20 are formed on the surfaces of polished diced sections 703, thereby completing the manufacture of the data reading/writing heads 100 as shown in FIG. 2.

Referring to FIGS. 7A through 7H, operations of manufacturing the data reading/writing heads 100 in each of the regions separated by the horizontal lines 701 and the vertical lines 702 will be described in detail. FIGS. 7A through 7G show both top views and sectional views taken along lines X-X' in FIGS. 7A through 7G.

Figure 7A:
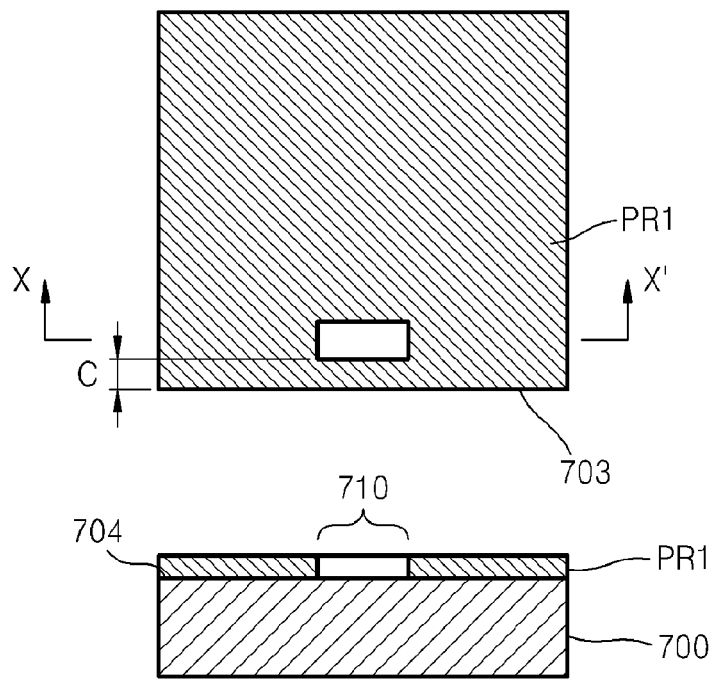
FIGS. 7A through 7H are diagrams for explaining operations of manufacturing a data reading/writing head using an electric field, according to an embodiment of the present invention.

As shown in FIG. 7A, a first mask PR1 defining a first region 710 separated from a surface 703 is patterned on a top surface 704 of the semiconductor substrate 700. Here, the surface 703 is an imaginary dicing surface, because the dicing operation is not performed at this point. The distance C between the imaginary dicing surface 703 and the first region 710 may be any distance as long as the first region 710 will not be polished during the polishing operation of the surface of the diced sections after the dicing operation shown in FIG. 6B. Thus, a portion of the top surface 704 of the semiconductor substrate 700 at the first region 710 is exposed, and a remaining portion of the top surface 704 of the semiconductor substrate 700 is covered by the first mask PR1. The operation described here may be performed by a common lithography method using a photoresist.

Figure 7B:
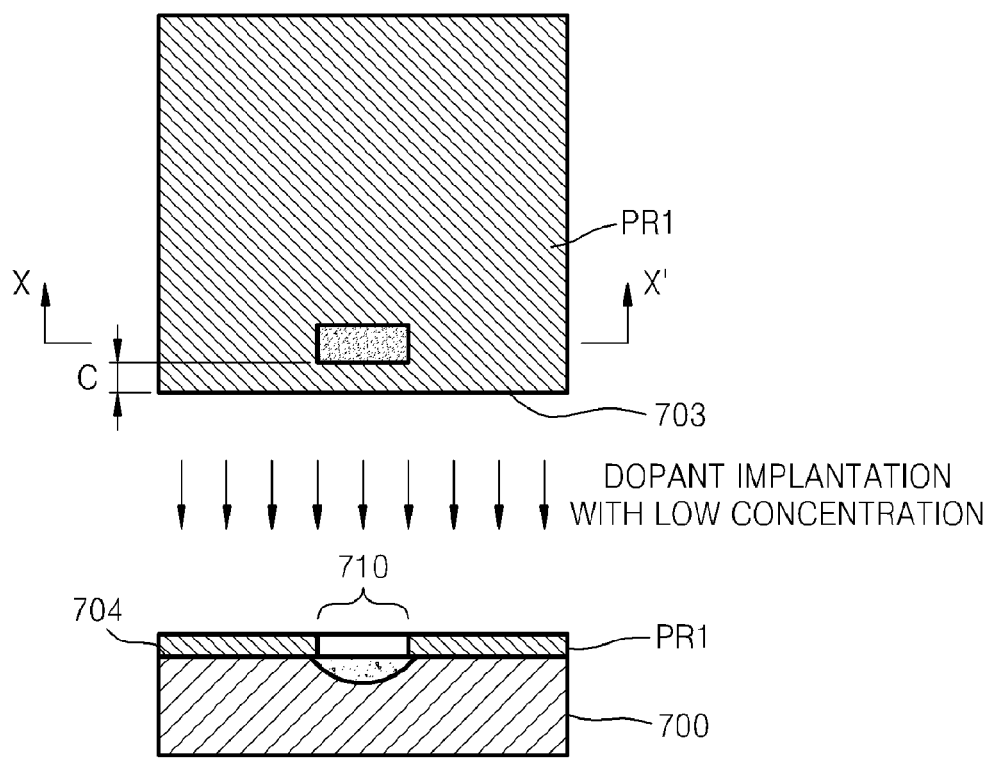

As shown in FIG. 7B, dopants are implanted with low concentration into the portion of the top surface 704 of the semiconductor substrate 700 at the first region 710 by using the first mask PR1 as an ion-implanting mask. Since the semiconductor substrate 700 is a p-type semiconductor substrate, the dopants are n-type dopants. The first mask PR1 is removed thereafter. Thus, the first region 710 becomes a low-concentration dopant region.

Figure 7C:
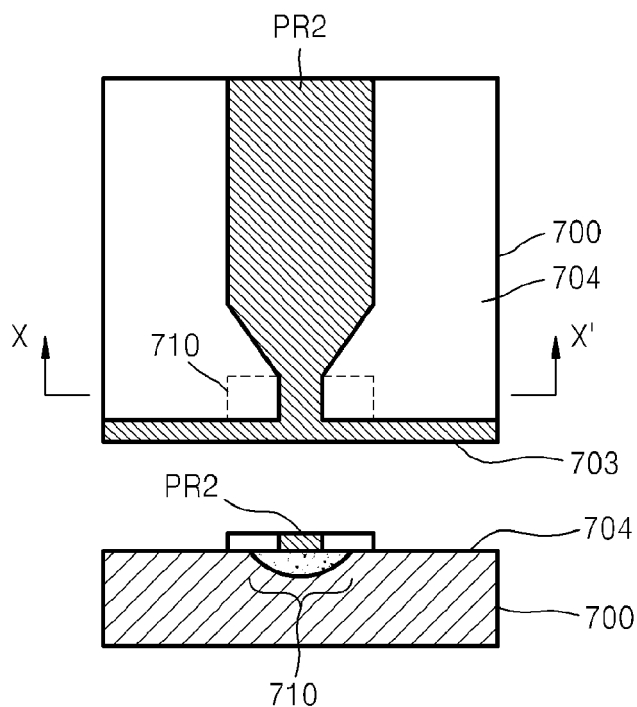

As shown in FIG. 7C, a second mask PR2 is patterned on the top surface 704 of the semiconductor substrate 700. The second mask PR2 is patterned such that the second mask PR2 covers the first region 710 at least partially and covers the region between the first region 710 and the imaginary dicing surface 703.

Figure 7D:
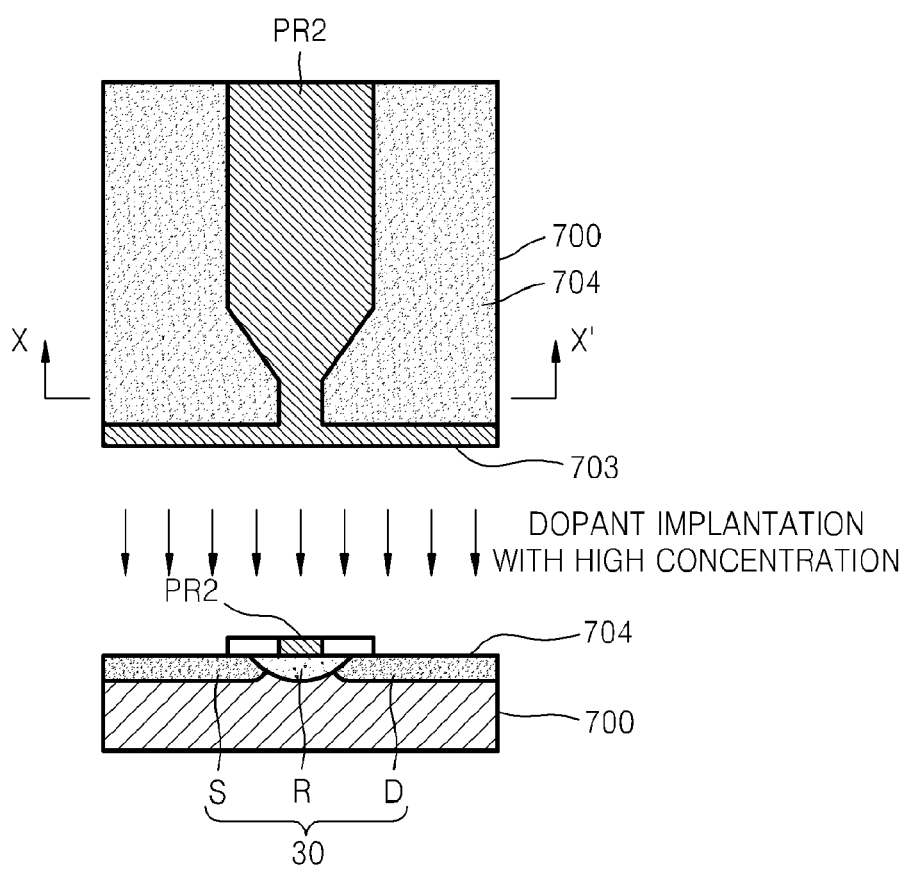

As shown in FIG. 7D, dopants are densely implanted into a portion of the top surface 704 of the semiconductor substrate 700 not covered by the second mask PR2 by using the second mask PR2 as an ion-implanting mask. The second mask PR2 is removed thereafter. Thus, the sensing unit 30 including the resistance region R, the source region S, and the drain region D is formed on the top surface 704 of the semiconductor substrate 700 at a position separated from the imaginary dicing surface 703.

Figure 7E:
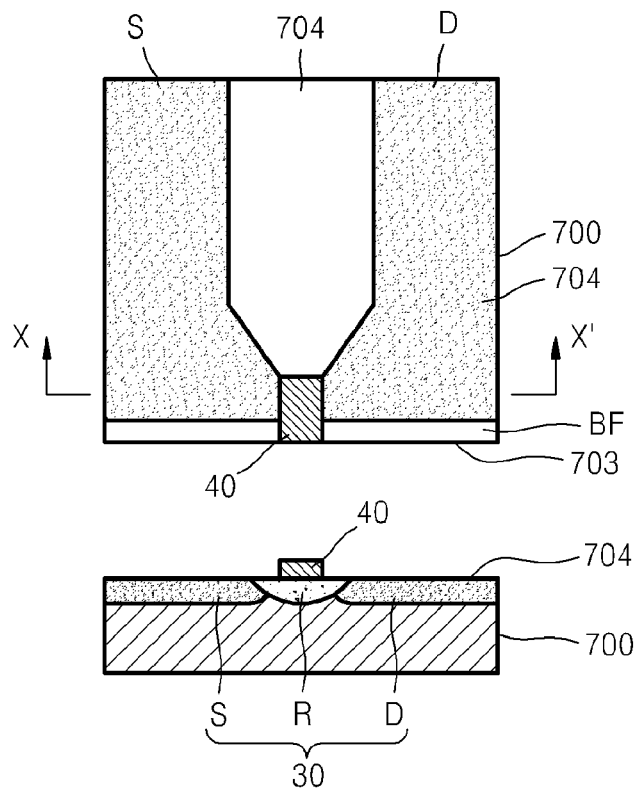

As shown in FIG. 7E, the floating gate 40 is formed on the resistance region R. To form the floating gate 40, a mask (not shown) exposing a top surface of the resistance region R is formed on the top surface 704 of the semiconductor substrate 700 whereon the sensing unit 30 is formed, and conductive materials such as metals or metal compounds are deposited onto a portion of the resistance region R exposed by the mask.

Figure 7F:
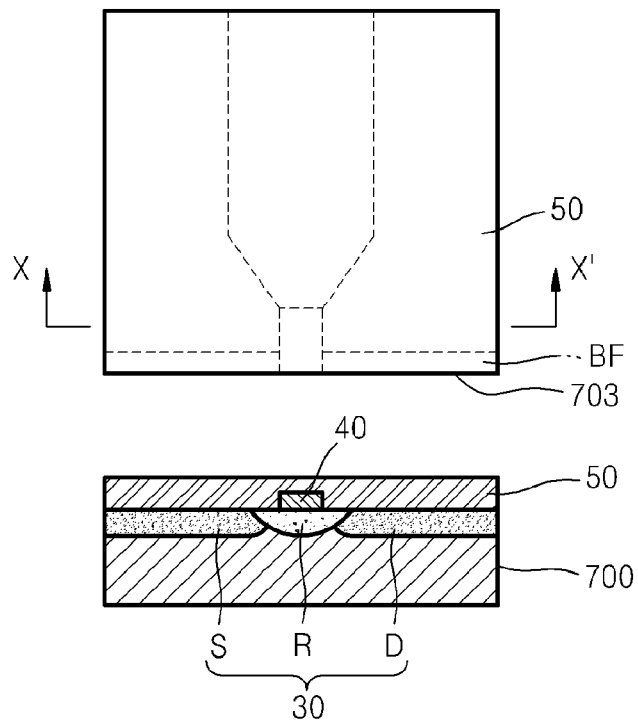

As shown in FIG. 7F, the insulation layer 50 is stacked to cover the floating gate 40 and the top surface 704 of the semiconductor substrate 700, and a top surface of the insulation layer 50 is planarized.

Figure 7G:
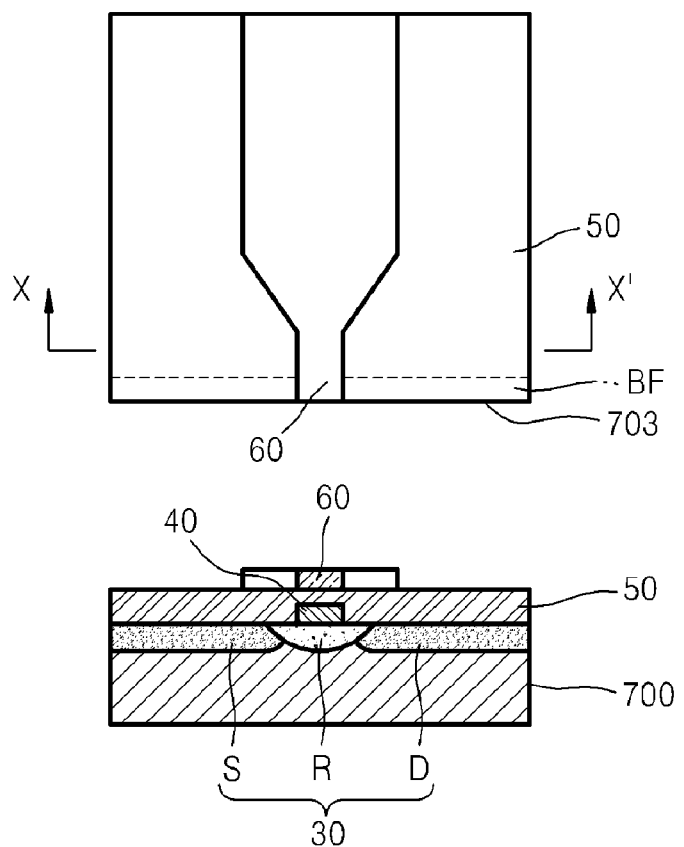

As shown in FIG. 7G, the writing electrode 60 is formed on the insulation layer 50. To form the writing electrode 60, a mask (not shown) defining a position of the writing electrode 60 is formed on the insulation layer 50, and conductive materials such as metals or metal compounds are deposited onto a portion of the insulation layer by the mask.

Figure 7H:
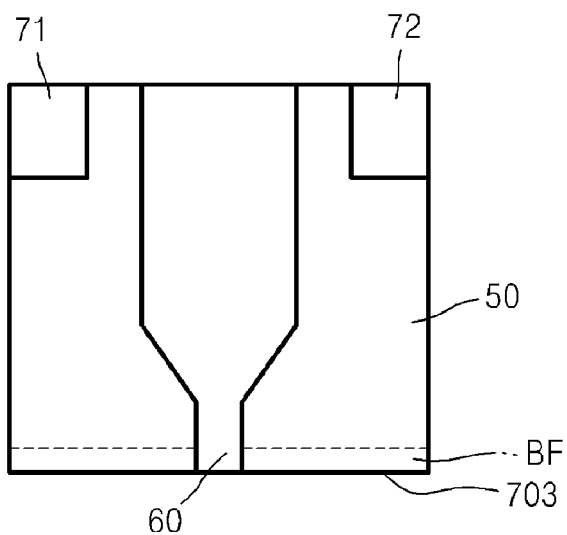

As shown in FIG. 7H, the electrode pads 71 and 72 can be formed by removing a portion of the insulation layer 50 to expose the source region S and the drain region D and depositing conductive materials such as metals or metal compounds onto the exposed regions.

As shown in FIG. 6B, the semiconductor substrate 700 is diced thereafter along the horizontal lines 701. The diced surface 703 is polished by using a chemical-mechanical polishing (CMP) method, for example. Since the sensing unit 30 is separated from the diced surface 703, the sensing unit 30 is not polished or damaged by the polishing operation. The resistance region R is thus formed in the manufacturing operations shown in FIGS. 7A and 7B. Accordingly, the width W of the resistance region R is only affected when the first mask PR1 is patterned, and is not affected in the polishing operation. If the first mask PR1 is patterned by using a common lithography method, the width W of the resistance region R is only affected by a resolution of the patterning operation. Therefore, the width W of the resistance region R, which affects the sensitivity of the data reading/writing head 100, can be controlled with high precision.

Figure 8:
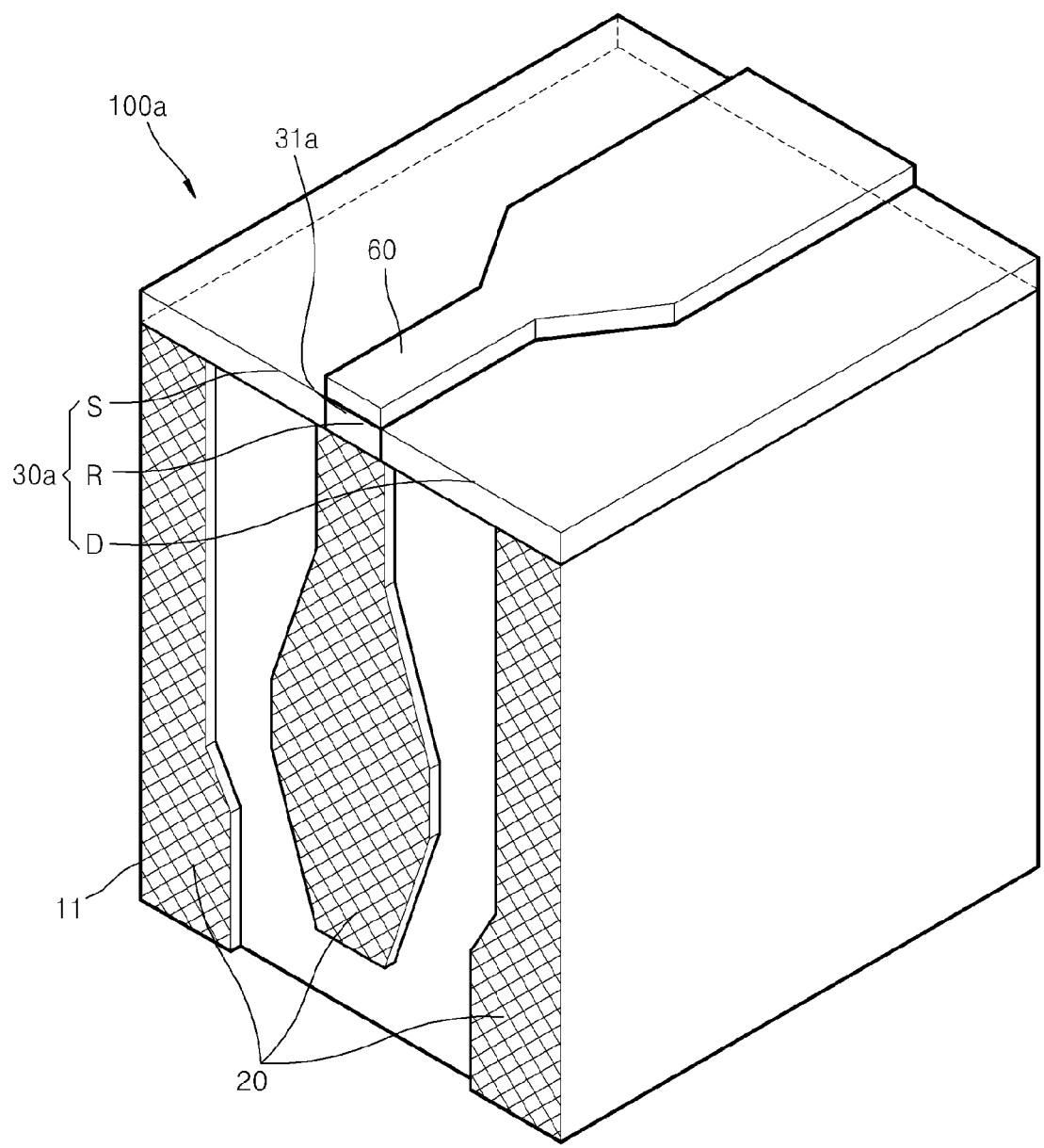
FIG. 8 is a diagram showing a data reading/writing head using an electric field, in which a resistance region is exposed on a first plane.

A data reading/writing head 100a using an electric field and including a sensing unit 30a protruding from the first plane 11 is shown in FIG. 8. Although not shown, an insulation layer is disposed between the writing electrode 60 and the resistance region R. For the data reading/writing head 100a using electric field, the semiconductor substrate 700 is diced to separate the data reading/writing head 100a, and the air bearing pattern 20 is formed on a surface of the diced section. The surface of the diced section is polished by using the CMP method. However, since the resistance region R is exposed on the first plane 11 of a semiconductor body 10, an edge 31a of the resistance region R is also polished. Thus, the resistance region R may be damaged. Also, the width W of the resistance region R may be changed by the polishing operation. However, as stated above, the resistance region R is not exposed in the polishing operation in the data reading/writing head 100 according to an embodiment of the present invention, and thus it is very unlikely that the resistance region R can be damaged during the polishing operation and the width W of the resistance region R can be precisely controlled without being affected by the polishing operation.

The air bearing pattern 20 is formed on the polished surface. The air bearing pattern 20 is well-known in the art of the present invention, and can be formed by using a well-known patterning and etching methods. Thus, the formation of the air bearing pattern 20 is not described below.

Manufacturing the data reading/writing head using electric field 100 is finished by dicing the diced semiconductor substrates 700 along the vertical lines 702.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data reading/writing head using an electric field to read/write data from/to a ferroelectric recording medium, the data reading/writing head comprising:
   a semiconductor body comprising a first plane on which an air bearing pattern is formed and a second plane crossing the first plane;
   a sensing unit, which is located on the second plane and reads data written to the ferroelectric recording medium, the sensing unit being separated from the first plane; and
   a floating gate disposed on the sensing unit, an end of the floating gate extending to the first plane to guide an electric field from the ferroelectric recording medium to the sensing unit.

2. The data reading/writing head of claim 1, wherein the sensing unit comprises a source region and a drain region, which are high-concentration dopant regions, and a resistance region, which is a low-concentration dopant region and disposed between the source region and the drain region.

3. The data reading/writing head using electric field of claim 2, wherein the floating gate is electrically connected to the resistance region.

4. The data reading/writing head claim 1, further comprising a writing electrode, disposed on the floating gate, and an insulation layer, interposed between the writing electrode and the floating gate.

5. A data reading/writing head using an electric field effect to read/write data from/to a ferroelectric recording medium, the data reading/writing head comprising:
   a semiconductor body comprising a first plane on which an air bearing pattern is formed and a second plane crossing the first plane;
   a sensing unit, which is located on the second plane and reads data written to the ferroelectric recording medium, the sensing unit comprising a source region and a drain region, which are high-concentration dopant regions, and a resistance region, which is a low-concentration dopant region and located between the source region and the drain region;
   a buffer disposed between the sensing unit and the first plane; and
   a floating gate disposed on the resistance region, an end of the floating gate extending to the first plane over the buffer to guide an electric field from the ferroelectric recording medium to the resistance region.

6. The data reading/writing head of claim 5, further comprising:
   a writing electrode disposed on the floating gate; and
   an insulation layer interposed between the writing electrode and the floating gate.

7. A data reading/writing apparatus using an electric field, the data reading/writing apparatus comprising:
   a ferroelectric recording medium; and
   a data reading/writing head using an electric field, floating above the ferroelectric recording medium, and reading/writing from/to the ferroelectric recording medium by using an electric field effect,
   wherein the data reading/writing head comprises:
      a semiconductor body comprising a first plane on which an air bearing pattern is formed and a second plane crossing the first plane;
      a sensing unit, which is located on the second plane and reads data written to the ferroelectric recording medium, the sensing unit being separated from the first plane; and
      a floating gate disposed on the sensing unit, an end of the floating gate extending to the first plane to guide an electric field from the ferroelectric recording medium to the sensing unit.

8. The data reading/writing apparatus of claim 7, wherein the sensing unit comprises a source region and a drain region, which are high-concentration dopant regions, and a resistance region, which is a low-concentration dopant region and located between the source region and the drain region.

9. The data reading/writing apparatus of claim 8, wherein the floating gate is electrically connected to the resistance region.

10. The data reading/writing apparatus of claim 7, wherein the data reading/writing head further comprises a writing electrode disposed on the floating gate and an insulation layer interposed between the writing electrode and the floating gate.

11. A data reading/writing apparatus using an electric field, the data reading/writing apparatus comprising:
a ferroelectric recording medium; and
a data reading/writing head using an electric field, floating above the ferroelectric recording medium, and reading/writing from/to the ferroelectric recording medium by using an electric field effect,
wherein the data reading/writing head comprises:
a semiconductor body comprising a first plane on which an air bearing pattern is formed and a second plane crossing the first plane;
a sensing unit, which is on the second plane and reads data written to the ferroelectric recording medium, the sensing unit comprising a source region and a drain region, which are high-concentration dopant regions, and a resistance region, which is a low-concentration dopant region and located between the source region and the drain region;
a buffer disposed between the sensing unit and the first plane;
a floating gate disposed on the resistance region, an end of the floating gate extending to the first plane over the buffer to guide an electric field from the ferroelectric recording medium to the resistance region.

12. The data reading/writing apparatus of claim 11, wherein the data reading/writing head further comprises:
a writing electrode disposed on the floating gate; and
an insulation layer interposed between the writing electrode and the floating gate.

13. A method of manufacturing a data reading/writing head using an electric field, the method comprising:
providing a semiconductor substrate;
forming a sensing unit at a position separated from an imaginary dicing surface on the semiconductor substrate, the sensing unit comprising a source region, a drain region, and a resistance region between the source region and drain region, wherein the source region and the drain region are high-concentration dopant regions and the resistance region is a low-concentration dopant region;
forming a floating gate having one end extended to the imaginary dicing surface by stacking conductive materials on the resistance region;
dicing the semiconductor substrate along the imaginary dicing surface;
polishing the diced surface to expose the floating gate; and
forming an air bearing pattern on the polished surface.

14. The method of claim 13, wherein the forming of the sensing unit comprises:
patterning a first mask defining a first region at a position separated from the imaginary dicing surface on a top surface of the semiconductor substrate;
forming the resistance region by implanting dopants with low concentration into the first region by using the first mask as an ion-implanting mask;
removing the first mask;
patterning a second mask covering the first region at least partially and completely covering a region between the first region and the imaginary dicing surface; and
forming the source region and the drain region by implanting dopants with high concentration into a portion of the semiconductor substrate not covered by the second mask by using the second mask as an ion-implanting mask.

15. The method of claim 14, further comprising:
forming an insulation layer on the top surface of the semiconductor substrate and the floating gate; and
forming a writing electrode by stacking conductive materials onto the insulation layer.

16. The method of claim 15, further comprising forming electrode pads electrically connected to the source region and the drain region, respectively, after removing a portion of the insulation layer.

17. A data reading/writing head, comprising:
a semiconductor body having a first plane formed on a first side and a second plane formed on a second side thereof which intersects the first plane;
a sensing unit located on the second plane for reading data written to a ferroelectric recording medium, wherein the sensing unit is spaced apart from the first plane by a predetermined distance; and
a floating gate disposed on and electrically connected to the sensing unit, wherein one end of the floating gate extends to reach the first plane in order to guide an electric field from the ferroelectric recording medium to the sensing unit.

18. The data reading/writing head according to claim 17, wherein the first plane and the second plane are perpendicular to each other, and wherein the first plane is adapted to face a recording surface of the ferroelectric recording medium.

* * * * *